US009849580B2

(12) United States Patent
Wang

(10) Patent No.: US 9,849,580 B2
(45) Date of Patent: Dec. 26, 2017

(54) DOOR SEPARATION DEVICE THAT IS USED FOR MULTI KINDS OF VEHICLES

(71) Applicant: Hyundai Motor Company, Seoul (KR)

(72) Inventor: Hee Joon Wang, Seongnam-Si (KR)

(73) Assignee: Hyundai Motor Company, Seoul (KR)

( * ) Notice: Subject to any disclaimer, the term of this patent is extended or adjusted under 35 U.S.C. 154(b) by 670 days.

(21) Appl. No.: 14/143,590

(22) Filed: Dec. 30, 2013

(65) Prior Publication Data

US 2015/0013132 A1    Jan. 15, 2015

(30) Foreign Application Priority Data

Jul. 11, 2013  (KR) ......................... 10-2013-0081606

(51) Int. Cl.
| | | |
|---|---|---|
| *B25H 1/00* | (2006.01) | |
| *B60J 5/04* | (2006.01) | |
| *B62D 65/00* | (2006.01) | |

(52) U.S. Cl.
CPC .......... *B25H 1/0007* (2013.01); *B60J 5/0463* (2013.01); *B62D 65/00* (2013.01); *Y10T 29/53978* (2015.01)

(58) Field of Classification Search
CPC ....... B23P 19/04; B25B 11/02; B25H 1/0007; B60J 5/0463; B62D 65/00; Y10T 29/53978
USPC ................ 29/281.5, 426.1, 525.01, 464, 468
See application file for complete search history.

(56) References Cited

U.S. PATENT DOCUMENTS

| | | | | | |
|---|---|---|---|---|---|
| 4,589,199 | A | * | 5/1986 | Ohtaki | B62D 65/06 198/575 |
| 4,907,331 | A | * | 3/1990 | Kaibuki | B23P 19/04 29/213.1 |
| 5,079,832 | A | * | 1/1992 | Ozawa | B62D 65/02 29/709 |
| 5,210,931 | A | * | 5/1993 | Ozawa | B62D 65/02 29/709 |
| 2012/0056440 | A1 | * | 3/2012 | Yeum | B25J 15/0052 294/81.2 |

FOREIGN PATENT DOCUMENTS

| | | |
|---|---|---|
| CN | 101032985 A | 9/2007 |
| JP | 6-18224 A | 1/1994 |
| JP | 3312468 B2 | 9/1995 |
| JP | 2005-537989 A | 12/2005 |
| KR | 10-0621907 B1 | 9/2006 |

* cited by examiner

*Primary Examiner* — Marc Carlson
(74) *Attorney, Agent, or Firm* — Morgan, Lewis & Bockius LLP

(57) ABSTRACT

A door separation device that is used for various kinds of vehicles to detach a door that is mounted on a vehicle body through a door hinge in a door separation process may include an upper side gripper and lower side gripper that is respectively on a base frame that can be mounted on an arm end of a robot and is movable in an upper and lower direction, and grips an upper end and a lower end of a door, a moving frame that is disposed on the base frame to be movable in a transfer direction of a vehicle body, and an upper side bolt separation unit and a lower side bolt separation unit that respectively has a pair of motorized runners for separating a bolt that is engaged with a door and an upper side hinge and a lower side hinge of a vehicle body.

12 Claims, 7 Drawing Sheets

(a)

(b)

DOOR SEPARATION DEVICE THAT IS USED FOR MULTI KINDS OF VEHICLES

CROSS-REFERENCE TO RELATED APPLICATION

The present application claims priority to Korean Patent Application No. 10-2013-0081606 filed on Jul. 11, 2013, the entire contents of which is incorporated herein for all purposes by this reference.

BACKGROUND OF THE INVENTION

Field of the Invention

An exemplary embodiment of the present invention is related to a door separation device that is used for various kinds of vehicles. More particularly, the present invention relates to a door separation device that is used for various kinds of vehicles so as to mount fittings in a vehicle body in a fitting process.

Description of Related Art

Generally, a mounting quality of a front door and a rear door of a vehicle is a core item that decides an inner side and an outer side quality of a vehicle. A component precision enhancement and a door mounting process quality enhancement are simultaneously necessary so as to improve the mounting quality of the door.

When a door is assembled on a vehicle body on a vehicle assembly line, a door hinge is mounted on a vehicle body through a door hinge mounting jig and a door is mounted on the door hinge, in a condition that a door is set on a vehicle body through a door mounting jig in a vehicle body factory of a vehicle assembly line.

Then, a gap and a height difference that is formed between a vehicle body and a door is measured in a gap and a height difference measuring process, and the gap and the height difference of the door are adjusted depending on the measured data.

Meanwhile, a vehicle body that the door is assembled on a vehicle body is transferred to a fitting factory through a transfer line. The door is separated from the door hinge so as to mount various kinds of fittings in a vehicle body in a fitting factory.

In this case, the door that is separated from the vehicle body is transferred to a next process through a transfer line and a hanger and the vehicle body passes a chassis mounting process, a final process, and so on to enter into a door mounting process, in a condition that various kinds of fittings are mounted therein.

In the separation process as described above, because the door that is assembled in a vehicle body factory is not fixed by a striker on a vehicle body and is fixed by a door fixation band, a door fixation band has to be eliminated so as to separate the door from the vehicle body.

Then, in a condition that the door is opened from the vehicle body in a separation process and the door is gripped by a loader, a manual tool is used to separate an engagement bolt that is engaged with a door hinge and a door, the door is separated from the vehicle body, and the door is put on a hanger.

As describe above, the manual tool is used to separate an engagement bolt and a series of process that separates a door from a vehicle body is performed by about four workers so as to separate a door from a vehicle body that is different from each other depending on the kinds of vehicles in a narrow space and with an uncomfortable pose.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a door separation device that is used for various kinds of vehicles having advantages of automatically separating a door from various kinds of vehicles in a separation process of a fitting factory.

In an aspect of the present invention, the door separation device that is used for various kinds of vehicles to detach a door that is mounted on a vehicle body through a door hinge in a door separation process, may include an upper side gripper and a lower side gripper that are respectively mounted on a base frame that is configured to be mounted on an arm end of a robot, wherein the upper side gripper and the lower side gripper are movable in an upper direction and a lower direction of the base frame, and selectively grip an upper end and a lower end of the door, a moving frame that is disposed on the base frame to be movable in a transfer direction of the vehicle body, and an upper side bolt separation unit and a lower side bolt separation unit that are mounted to the moving frame and respectively may have a pair of motorized runners for separating a bolt that is engaged with the door and an upper side hinge and a lower side hinge of the vehicle body.

The motorized runners are disposed to be configured to reciprocate in a vehicle width direction on the upper side bolt separation unit and the lower side bolt separation unit.

The lower side bolt separation unit is disposed on the moving frame to move in an upper and lower direction corresponding to a distance between door hinges based on the upper side bolt separation unit.

The upper side bolt separation unit and the lower side bolt separation unit are rotatably disposed on the moving frame in an upper direction and a lower direction corresponding to an engagement angle of the door hinge.

The door separation device may include a plurality of vision sensors that is disposed on the base frame to detect a position of the bolt of the door hinge.

The upper side gripper may include a first gripper arm that is slidably disposed on a first moving element disposed on the base frame to be configured to reciprocate in the upper direction and the lower direction, and a first attachment that is disposed on the first gripper arm to support the upper end of the door.

The lower side gripper may include a second gripper arm that is disposed on a second moving element disposed on the base frame and is disposed on one straight line passing the first moving element to reciprocate in the upper and lower direction, and a second attachment that is disposed on the second gripper arm to support the lower end of the door.

The second attachment is disposed on the second gripper arm to be configured to swivel through a ball joint and a swivel pad corresponding to a lower end portion angle of the door.

The moving frame is disposed on the base frame to reciprocate in the transfer direction of the vehicle body by a third moving element having an operating cylinder.

The upper side bolt separation unit may include a first mounting bracket that is rotatably disposed on an upper side of the moving frame through a first rotation element, and a first pair of motorized runners is disposed on the first mounting bracket through each fourth moving element to reciprocate in a width direction of a vehicle.

The lower side bolt separation unit may include a second mounting bracket that is rotatably disposed at a lower side of the moving frame through a second rotation element, and a second pair of motorized runners is disposed on the second mounting bracket to reciprocate in the width direction of the vehicle through each fifth moving element.

The lower side bolt separation unit is disposed on the moving frame through a sixth moving element having an operating cylinder to reciprocate in the upper direction and the lower direction.

The motorized runners may include a motorized nut runner portion and a bolt socket portion that is connected to the motorized nut runner portion.

In another aspect of the present invention, a door separation device that is used for various kinds of vehicles to detach a door that is mounted on a vehicle body through a door hinge in a door separation process, may include a base frame that is disposed on an arm end of a robot, an upper side gripper and a lower side gripper that are disposed on the base frame and is movable in an upper direction and a lower direction to grip an upper end and a lower end of the door, a moving frame that is disposed on the base frame to be movable in a transfer direction of the vehicle body, an upper side bolt separation unit that is disposed to an upper side of the moving frame to be movable in a width direction of a vehicle, and may include a first pair of motorized runners that separate a bolt that is engaged with an upper side door hinge of a vehicle body and a door, a lower side bolt separation unit that is disposed to reciprocate in the width direction of the vehicle, may include a second pair of motorized runners that separate a bolt that is engaged with a lower side door hinge of the vehicle body and the door, and is disposed at a lower side of the moving frame to reciprocate in an upper and lower direction corresponding to a distance distribution between door hinges based on the upper side bolt separation unit, a rotation element that is disposed on the moving frame and respectively rotates the upper side bolt separation unit and the lower side bolt separation unit corresponding to an engagement angle distribution of the door hinge, and a plurality of vision sensors that is disposed on the base frame to detect a position of a bolt of the door hinge.

The moving frame reciprocates on the base frame in the transfer direction of the vehicle body through an operating cylinder and a guider.

The lower side bolt separation unit reciprocates on the moving frame in the upper and lower direction through an operating cylinder and a guider.

The upper side gripper and the lower side gripper reciprocate on the base frame in the upper direction and the lower direction through a drive motor and a LM (Linear Motion) module respectively.

The motorized runners reciprocate on the moving frame in the width direction of the vehicle through an operating cylinder and a guider.

The vision sensor detects a trim hole that is formed in an inner panel of the door.

The motorized runners may include a motorized nut runner portion having an operating unit at a first side end portion thereof and a bolt separation socket portion that is connected to a second side end portion of the motorized nut runner portion.

An exemplary embodiment of the present invention varies the position of the motorized runner corresponding to a door, a distance between a door hinge, and an engagement angle of a door hinge that is respectively different from each other depending on the kinds of vehicles such that the door is automatically separated from the vehicle body.

Accordingly, because the door is automatically separated from the vehicle body in an exemplary embodiment of the present invention, a work time for separating the door is reduced, the work is convenient, and a separation of a painting film of an inner panel is prevented, wherein the separation of the painting film is caused by an interference between a bolt separation tool and a door inner panel in a narrow space.

Also, because the door is automatically separated in a fitting factory in an exemplary embodiment of the present invention, a cycle time and work force in the fitting factory can be reduced, a safety accident and a physical damage of a worker can be reduced, and production cost and investment cost of the vehicle can be saved.

Further, because the position of the motorized runner is adjusted corresponding to a door, a distance between a door hinge, and an engagement angle of a door hinge that is different from each other depending on the kinds of vehicles in an exemplary embodiment of the present invention, the flexible productivity of various kinds of vehicles is improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
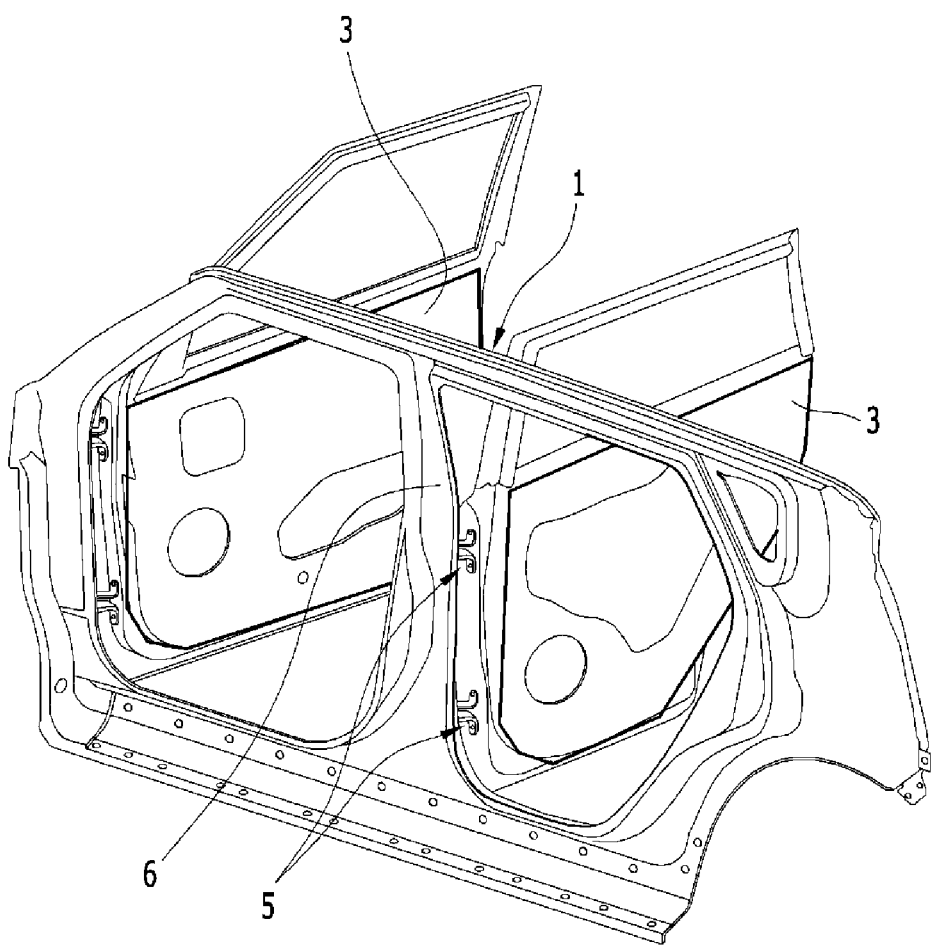
FIG. 1 shows an engagement state that a vehicle body and a door are engaged with each other by using a door separation device that is used in various kinds of vehicles according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Portions having no relation with the description will be omitted in order to explicitly explain an exemplary embodiment of the present invention, and the same reference numerals will be used for the same or similar elements throughout the specification.

In the drawings, size and thickness of each element is approximately shown for better understanding and ease of description. Therefore, the present invention is not limited to the drawings, and the thicknesses of layers, films, panels, regions, etc., are exaggerated for clarity.

Discriminating the names of components with the first, the second, etc. in the following description is for discriminating them for the same relationship of the components and the components are not limited to the order in the following description.

Throughout the specification, unless explicitly described to the contrary, the word "include" and variations such as "comprises" or "comprising", will be understood to imply the inclusion of stated elements but not the exclusion of any other elements.

In addition, the terminologies such as " . . . unit", " . . . means", " . . . part", or " . . . member", which are disclosed in the specification, refer to a unit of an inclusive constituent which performs at least one of the functions or operations.

Figure 2:
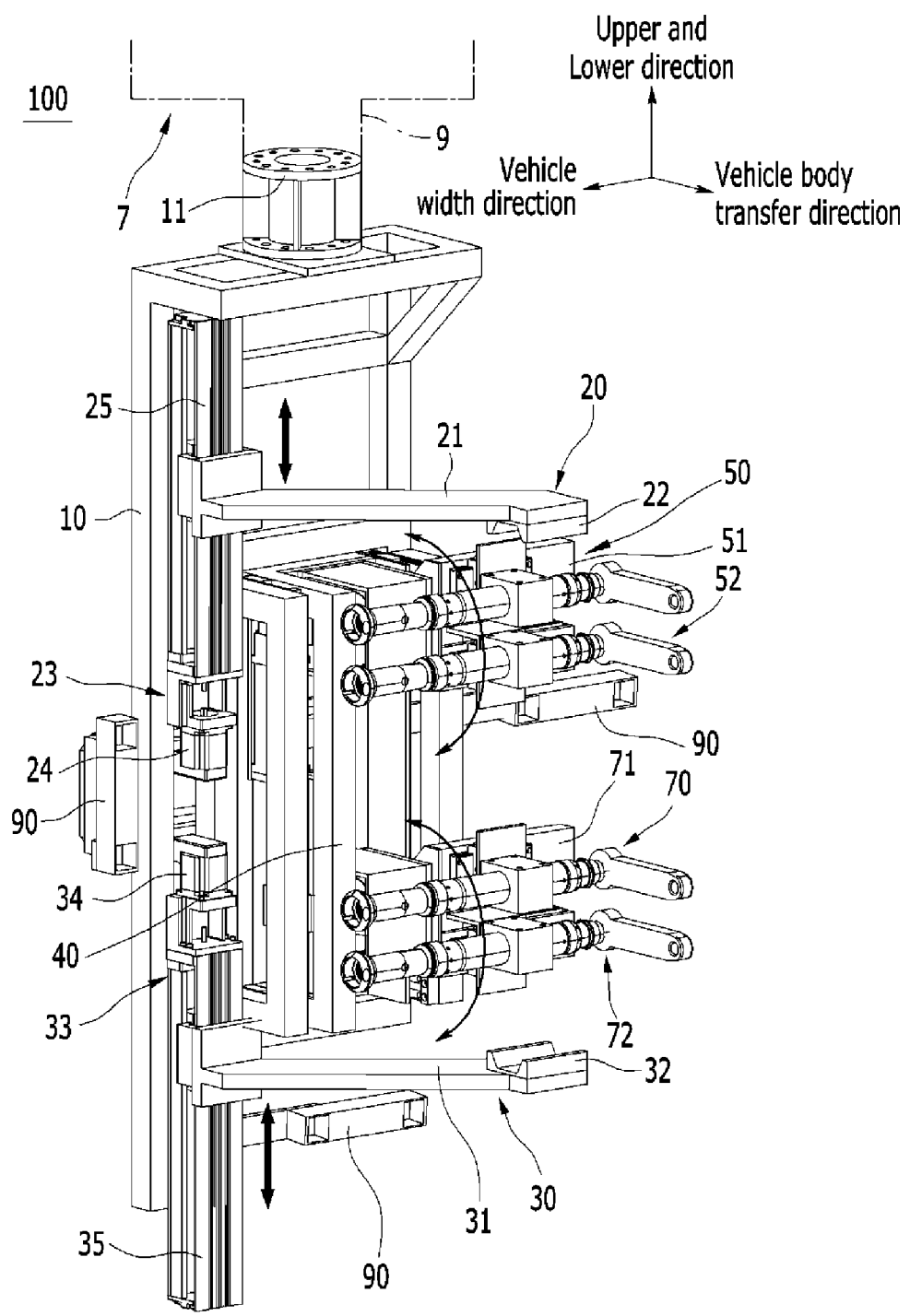
FIG. 2 is a perspective view showing a door separation device that is used in various kinds of vehicles according to an exemplary embodiment of the present invention.

FIG. 1 shows an engagement state that a vehicle body and a door are engaged with each other by using a door separation device that is used in various kinds of vehicles according to an exemplary embodiment of the present invention, FIG. 2 is a perspective view showing a door separation device that is used in various kinds of vehicles according to an exemplary embodiment of the present invention.

Referring to FIG. 1 and FIG. 2, a door separation device 100 that is used in various kinds of vehicles according to an exemplary embodiment of the present invention can be applied to a separation process that separates a door 3 that is assembled on a vehicle body 1 in a vehicle body factory of a vehicle assembly line. The door 3 is separated from the vehicle body 1 so as to mount fittings in the vehicle body 1 in a fitting factory.

For example, a door hinge 5 is mounted on a vehicle body 1 through a door hinge assemble jig in a vehicle body factory of a vehicle assembly line, and a door 3 is engaged therewith through a bolt.

In a vehicle body factory, a door 3 is not fixed on a vehicle body 1 through a striker, in a condition in which a door fixation band is used to fix a door 3 corresponding to a vehicle body 1, a vehicle body 1 is transferred to a fitting factory.

Accordingly, the door fixation band is eliminated in a separation process of a fitting factory, a door 3 is opened from a vehicle body 1, and a bolt that is engaged on the door hinge 5 and the door 3 is disjointed by a door separation device that is used in various kinds of vehicles according to an exemplary embodiment of the present invention.

In this case, in a condition that a door hinge 5 is engaged with an upper side and a lower side of a front side pillar and a rear side pillar at a side assembly 6 of a vehicle body 1, the door hinge 5 can be engaged with the door 3 through a bolt.

The door hinge 5 includes a vehicle body side hinge bracket that is combined with a vehicle body side, a door side hinge bracket that is combined with a door side, and a hinge pin that combines the vehicle body side hinge bracket and the door side hinge bracket through a hinge structure.

Here, the door hinge 5 that is mounted on an upper side and a lower side of a pillar of the vehicle body 1 is engaged with the door 3 through a pair of bolts. Further, a distance between the door hinge 5 that is respectively mounted on a pillar upper side and lower side of the vehicle body 1 is different depending on the kinds of vehicles, and the engagement angle of the door hinge 5 with the door 3 can be different depending on the kinds of vehicle.

In an exemplary embodiment of the present invention, a door 3 is opened from a vehicle body 1 that is transferred along a transfer line, the opened door 3 is separated from the body 1 in a separation process of a fitting factory, and therefore the direction that this device 100 is positioned on the door 3 can be defined to a transfer direction of the vehicle body 1.

A transfer direction of a vehicle body is a T direction, a width direction of a vehicle body is a L direction, and a height direction of a vehicle body is a H direction in a field of this art, in an exemplary embodiment of the present invention, the direction is not defined by the LTH direction, the direction is defined by a transfer direction of a vehicle body, a vehicle width direction, and a height direction.

The door separation device 100 that is used in various kinds of vehicles according to an exemplary embodiment of the present invention has a structure that the door 3 is automatically separated from the vehicle body 1 having various kinds in a separation process of a fitting factory.

That is, an exemplary embodiment of the present invention provides a door separation device 100 that is used in various kinds of vehicle corresponding to different kinds of door 3, a different distance between door hinges 5, and a different engagement angle of the door hinge 5 so as to automatically separate the door 3.

For this, the door separation device 100 that is used in various kinds of vehicles according to an exemplary embodiment of the present invention includes a base frame 10, an upper side gripper 20, a lower side gripper 30, a moving frame 40, an upper side bolt separation unit 50, a lower side bolt separation unit 70, and a vision sensor 90.

The base frame 10 is mounted or separated on or from a front end of the arm 9 of the robot 7 and includes a tool changer 11 that is selectively combined on a front end of the arm 9 of the robot 7.

All constituent elements that will be described can be mounted on the base frame 10 that is described above. The base frame 10 is used to support the constituent elements and has auxiliary elements such as a block, a plate, a housing, a cover, a collar, and so on.

However, the auxiliary elements is used to mount each constituent elements on the base frame 10, and the auxiliary elements can be called as a base frame 10 except exceptional cases in an exemplary embodiment of the present invention.

For example, the base frame 10 has a structure that unit frames having a bar shape are connected in a horizontal direction and a vertical direction.

In an exemplary embodiment of the present invention, the upper side gripper 20 grasps an upper end portion of the door 3, for example, a door belt line side of the door 3 and is disposed to reciprocate in an upper direction and a lower direction at an upper side of the base frame 10.

The upper side gripper 20 includes a first gripper arm 21 and a first attachment 22. The first gripper arm 21 is disposed to reciprocate in an upper direction and a lower direction at an upper side of the base frame 10 by the first moving element 23.

Here, the first moving element 23 is a motorized unit that moves in an upper direction and a lower direction and is disposed in an upper and lower direction at an upper side of the base frame 10. The first moving element 23 includes a first drive motor 24 and a first LM module 25.

The first drive motor 24 is disposed on the base frame 10, and the first LM module 25 is connected to the first drive motor 24 and is disposed on the base frame 10. The first gripper arm 21 is slidably combined with the first LM module 25 to transform rotation movement of the first drive motor 24 to a linear straight movement, which can be a LM guide having a housing, a guide rail, a guide block, and a lead screw.

The first moving element 23 includes a LM movement device that has well known to a person skilled in the art, and further description thereof will be omitted in this specification.

Accordingly, when the first drive motor 24 of the first moving element 23 is operated, the first LM module 25 transforms rotation movement of the first drive motor 24 to a linear straight movement such that the first gripper arm 21 can reciprocate in an upper and lower direction through the first LM module 25.

The first attachment 22 is supports an upper end portion of the door 3 to be disposed on an end portion of the first gripper arm 21 and has a U shape that is opened toward a lower side to have a wider type attachment.

As an alternative embodiment, it is described that the number of the first attachment 22 of the upper side gripper 20 is one and is disposed at an end portion of the first gripper arm 21 in an exemplary embodiment of the present invention, but it is not limited thereto, another first attachment 22 can be disposed at an end portion that is combined with a LM module of the first gripper arm 21.

That, two first attachments 22 of the upper side gripper 20 according to an exemplary embodiment of the present invention can grasp both sides of an upper end portion of the door 3.

In an exemplary embodiment of the present invention, the lower side gripper 30 grasps or supports a lower end portion of the door 3 and can be disposed to be reciprocate in an upper and lower direction on the base frame 10 according to an the upper side gripper 20.

The lower side gripper 30 includes the second gripper arm 31 and the second attachment 32. The second gripper arm 31 can be disposed at a lower side of the base frame 10 to reciprocate in an upper and lower direction by the second moving element 33.

Here, the second moving element 33 is a motorized unit that moves in an upper and lower direction to be disposed at a lower side of the base frame 10 in an upper and lower direction and is disposed at one straight line corresponding to the first moving element 23. The second moving element 33 includes a second drive motor 34 and a second LM module 35.

The second drive motor 34 is disposed on the base frame 10 and the second LM module 35 is connected to the second drive motor 34 to be disposed on the base frame 10. The second gripper arm 31 is slidably combined with the second LM module 35 to transform rotation movement of the second drive motor 34 to a linear straight movement and can have a LM guide having a housing, a guide rail, a guide block, and a lead screw LM guide.

The second moving element 33 includes a LM movement device that has well known to a person skilled in the art, and further description thereof will be omitted in this specification.

Accordingly, when the second drive motor 34 of the second moving element 33 is operated, the second LM module 35 transforms rotation movement of the second drive motor 34 to a linear straight movement such that the second gripper arm 31 can reciprocate in an upper and lower direction through the second LM module 35.

The second attachment 32 is supports a lower end portion of the door 3 to be disposed on an end portion of the second gripper arm 31 and has a U shape that is opened toward an upper side to have a wider type attachment.

Meanwhile, in an exemplary embodiment of the present invention, the second attachment 32 of the lower side gripper 30 can be disposed at a free end portion of the second gripper arm 31 to swivel corresponding to an angle of a lower end of the door 3.

Figure 3:
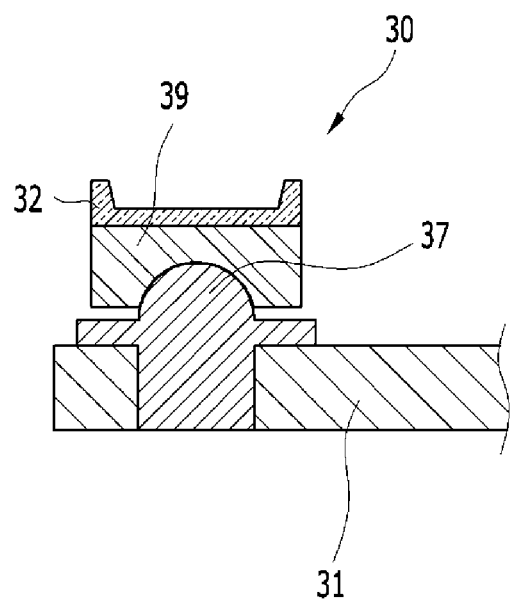
FIG. 3 is a sectional schematic diagram showing a swivel structure of a lower side gripper that is applied to a door separation device that is used in various kinds of vehicles according to an exemplary embodiment of the present invention.

For this, as shown in FIG. 3, a ball joint 37 is fixed on a free end of the second gripper arm 31 and a swivel pad 39 is combined on the ball joint 37 to swivel. And, the second attachment 32 is fixed on the swivel pad 39.

Accordingly, in a case in which the second gripper arm 31 is moved in an upper and lower direction through the second moving element 33 and the door 3 is grasped by the second attachment 32, the second attachment 32 is swiveled by the ball joint 37 and the swivel pad 39 to absorb a lower end angle of the door 3 such that the lower end thereof is grasped.

Referring to FIG. 1 and FIG. 2, in an exemplary embodiment of the present invention, the moving frame 40 is used to a mount upper side bolt separation unit 50 and a lower side bolt separation unit 70 that will be described later and is disposed on the base frame 10 to reciprocate in a transfer direction of the vehicle body 1 (refers to FIG. 4).

Figure 4:
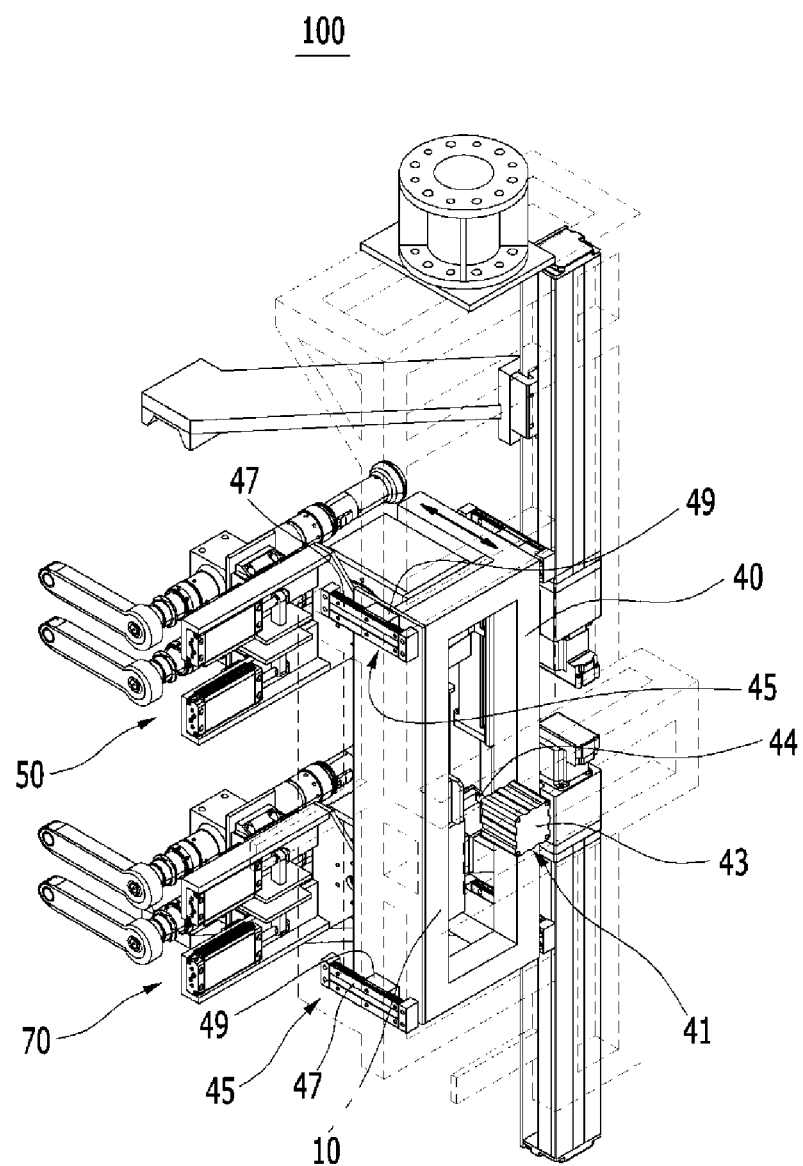
FIG. 4 shows a movement structure of a moving frame that is applied to a door separation device that is used in various kinds of vehicles according to an exemplary embodiment of the present invention.

The moving frame 40 has a structure that unit frames having bar type are connected in a horizontal direction and a vertical direction and a separate plate is attached on the unit frame and can reciprocate in a transfer direction of the vehicle body 1 by the third moving element 41 as shown in FIG. 4.

The third moving element 41 is used to move the moving frame 40 in a transfer direction of the vehicle body 1 on the base frame 10 and includes a first operating cylinder 43 and a pair of first guider 45.

The first operating cylinder 43 is fixed on the base frame 10 and is connected to the moving frame 40 through the first operating rod 44.

The first guider 45 is respectively disposed at an upper side and a lower side between the base frame 10 and the moving frame 40 based on the drawing. The first guider 45 includes a first guide rail 47 that is fixed on the base frame 10 and a first guide block 49 that is fixed on the moving frame 40 to be slidably combined with the first guide rail 47.

Accordingly, when the first operating cylinder 43 is operated, the first operating rod 44 is moved forward or backward, the moving frame 40 slides along the first guide rail 47 through the first guide block 49 and can reciprocate in a transfer direction of the vehicle body 1 on the base frame 10.

Referring to FIG. 1 and FIG. 2, in an exemplary embodiment of the present invention, the upper side bolt separation unit 50 grasps an upper end portion and a lower end portion of the door 3 through the upper side gripper and the lower side gripper 20 and 30 and is used to disjoint an upper side door hinge 5 and a pair of bolts that is engaged with the door 3 of the vehicle body 1.

The upper side bolt separation unit 50 is rotatably disposed at an upper side of the moving frame 40 in an upper and lower direction corresponding to an engagement angle of the upper side door hinge 5 of the vehicle body 1 that is different depending on the kinds of a vehicle.

The upper side bolt separation unit 50 includes a first mounting bracket 51 that is disposed at an upper side of the moving frame 40 and a pair of first motorized runner 52 that is disposed at the first mounting bracket 51.

Figure 5:
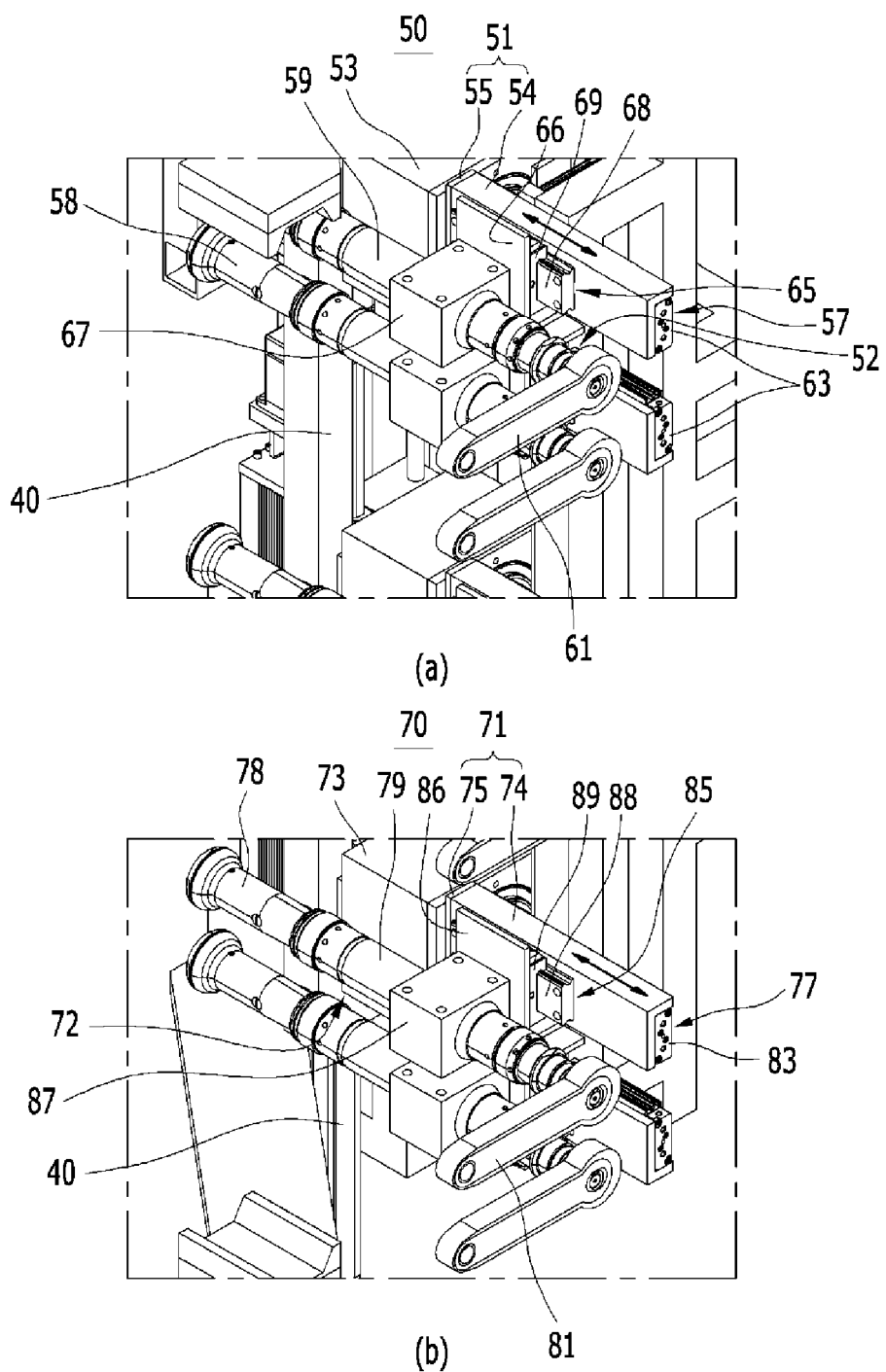
FIG. 5 and FIG. 6 shows an upper side bolt separation unit and a lower side bolt separation unit that is used in various kinds of vehicles according to an exemplary embodiment of the present invention.
Figure 6:
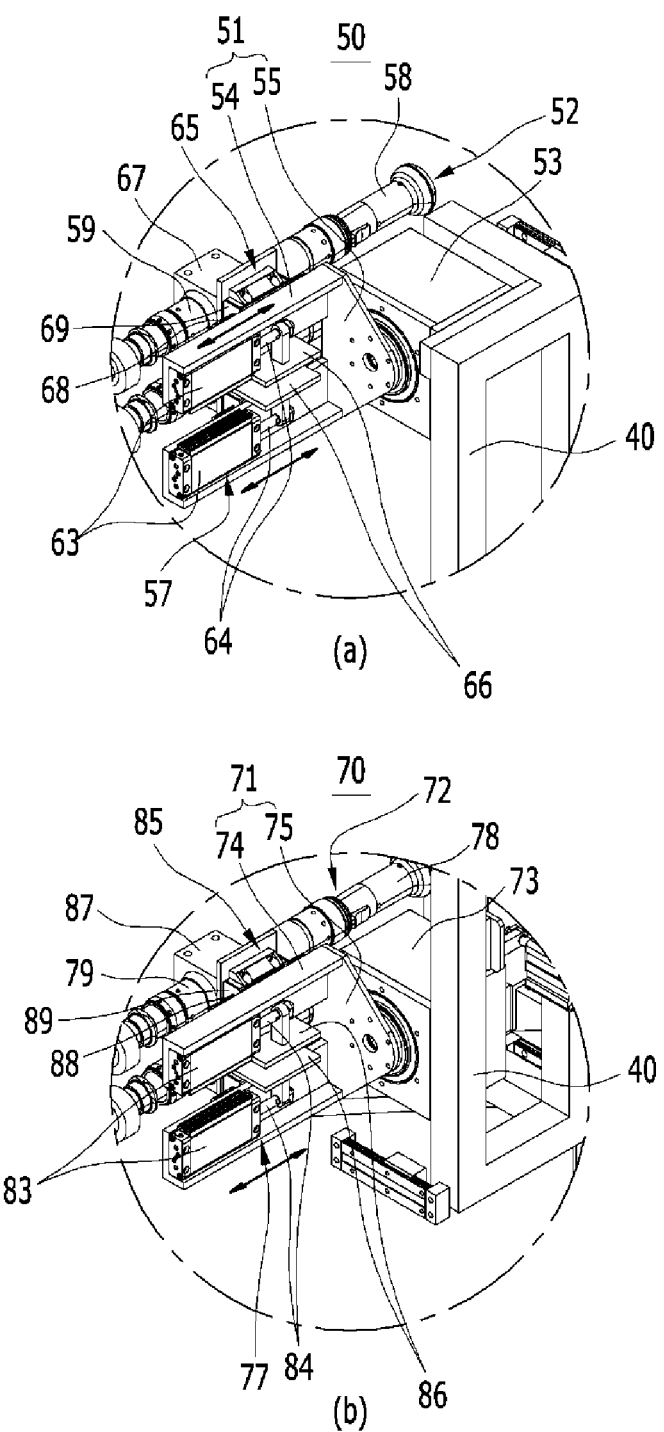

FIG. 5 and FIG. 6 shows an upper side bolt separation unit and a lower side bolt separation unit that is used in various kinds of vehicles according to an exemplary embodiment of the present invention.

Referring to FIG. 5 and FIG. 6, in the upper side bolt separation unit 50 according to an exemplary embodiment of the present invention, the first mounting bracket 51 is used to mount a pair of first motorized runners 52 that will be described later and is rotatably disposed at an upper side of the moving frame 40 through the first rotation element 53 in an upper and lower direction.

The first mounting bracket 51 includes a pair of mounting base 54 that are in parallel with each other and is disposed in a width direction of a vehicle width direction and a rotation base 55 that is connected to the mounting base 54 to be combined with the first rotation element 53 that will be described later.

Here, the first rotation element 53 is an operating source that rotates the first mounting bracket 51 on the moving frame 40 in an upper and lower direction, is fixed on an upper side of the moving frame 40, and is connected to the rotation base 55 of the first mounting bracket 51.

The first rotation element 53 includes a servo motor that is well known to a person skilled in this art so as to offer a torque and a harmonic drive so as to decelerate the rotation speed of the servo motor.

The harmonic drive of them has high rotation precision having a low back lash in a gear structure, the size thereof is smaller than that of a deceleration unit of an equal capacity and the vibration thereof is low, and therefore the harmonic drive has been used as a rotation shaft deceleration unit of a robot.

The pair of first motorized runner 52 is used to disjoint the upper side door hinge 5 of a vehicle body 1 and a pair of bolts that is engaged with the door 3 in a motorized method, is respectively disposed on the mounting base 54 of the first mounting bracket 51 in a width direction of vehicle, and is disposed on the mounting base 54 through the fourth moving element 57 to reciprocate in a width direction of a vehicle.

Each first motorized runner 52 includes a motorized nut runner portion 59 having an operating unit 58 such as a motor at one side end portion and a bolt disjoint socket portion 61 that is connected to the other end portion of the motorized nut runner portion 59.

The motorized nut runner portion 59 is rotated by the operating unit 58, and the bolt disjoint socket portion 61 is combined with a bolt that engages the upper side door hinge 5 and the door 3 and receives torque from the motorized nut runner portion 59 to disjoint the bolt.

The first motorized runner 52 is a motorized nut runner device that is well known to a person skilled in this art, and the detailed description thereof will be omitted.

Meanwhile, each fourth moving element 57 that is configured to reciprocate a pair of first motorized runner 52 in a width direction of a vehicle on the mounting base 54 of the first mounting bracket 51 includes a second operating cylinder 63 and a second guider 65.

The second operating cylinder 63 is fixed on the mounting base 54 of the first mounting bracket 51 and is substantially connected to the first motorized runner 52 through the second operating rod 64.

The second guider 65 includes a first connection bracket 66 that is connected to the second operating rod 64 of the second operating cylinder 63, a first moving block 67 that is fixed on the first connection bracket 66 and is combined with the motorized nut runner portion 59 of the first motorized runner 52, a second guide rail 68 that is fixed on the mounting base 54 of the first mounting bracket 51, and a second guide block 69 that is fixed on the first connection bracket 66 and is slidably combined with second guide rail 68.

Accordingly, when the second operation cylinder 63 is operated to move forward or backward the second operating rod 64, the first connection bracket 66 can reciprocate in a width direction of a vehicle through the second guide block 69 along the second guide rail 68.

Thereby, because a pair of first motorized runner 52 is fixed on the first connection bracket 66 through the first moving block 67, the first connection bracket 66 can reciprocate in a width direction of a vehicle width direction.

Referring to FIG. 1 and FIG. 2, in an exemplary embodiment of the present invention, the lower side bolt separation unit 70 grasps an upper end portion and a lower end portion of the door 3 through the upper side gripper and lower side gripper 20 and 30 and disjoints a pair of bolts that are engaged with a lower side door hinge 5 of a vehicle body 1 and the door 3, in a condition in which the moving frame 40 is moved to the door 3 side along the transfer direction of the vehicle body 1.

The lower side bolt separation unit 70 is rotatably disposed at a lower side of the moving frame 40 in an upper and lower direction corresponding to an engagement angle of the lower side door hinge 5 of the vehicle body 1 that is different depending on kinds of a vehicle.

And, the lower side bolt separation unit 70 is disposed to reciprocate in an upper and lower direction on the moving frame 40 at a lower side of the upper side bolt separation unit 50 corresponding to a distance between an upper side and a lower side of the door hinge 5 of the vehicle body 1 side.

The lower side bolt separation unit 70 includes a second mounting bracket 71 that is disposed at a lower side of the moving frame 40 and a pair of second motorized runner 72 that is disposed at the second mounting bracket 71.

Referring to FIG. 5 and FIG. 6, in the lower side bolt separation unit 70 according to an exemplary embodiment of the present invention, the second mounting bracket 71 is used to mount a pair of second motorized runners 72 that will be described later and is rotatably disposed at an upper side of the moving frame 40 through the second rotation element 53 in an upper and lower direction.

The second mounting bracket 71 includes a pair of mounting base 74 that are in parallel with each other and is disposed in a width direction of a vehicle width direction and a rotation base 75 that is connected to the mounting base 74 to be combined with the second rotation element 73 that will be described later.

Here, the second rotation element 73 is an operating source that rotates the second mounting bracket 71 on the moving frame 40 in an upper and lower direction, is fixed on an upper side of the moving frame 40, and is connected to the rotation base 75 of the second mounting bracket 71.

The second rotation element 73 includes a servo motor that is well known to a person skilled in this art so as to offer a torque and a harmonic drive so as to decelerate the rotation speed of the servo motor.

The harmonic drive of them has high rotation precision having a low back lash in a gear structure, the size thereof is smaller than that of a deceleration unit of an equal capacity and the vibration thereof is low, and therefore the harmonic drive has been used as a rotation shaft deceleration unit of a robot.

The pair of second motorized runner 72 is used to disjoint the upper side door hinge 5 of a vehicle body 1 and a pair of bolts that is engaged with the door 3 in a motorized method, is respectively disposed on the mounting base 74 of the second mounting bracket 71 in a width direction of vehicle, and is disposed on the mounting base 54 through the fifth moving element 77 to reciprocate in a width direction of a vehicle.

Each second motorized runner 72 includes a motorized nut runner portion 79 having an operating unit 88 such as a motor at one side end portion and a bolt disjoint socket portion 81 that is connected to the other end portion of the motorized nut runner portion 79.

The motorized nut runner portion 79 is rotated by the operating unit 78, and the bolt disjoint socket portion 81 is combined with a bolt that engages the upper side door hinge 5 and the door 3 and receives torque from the motorized nut runner portion 79 to disjoint the bolt.

The second motorized runner 72 is a motorized nut runner device that is well known to a person skilled in this art, and the detailed description thereof will be omitted.

Meanwhile, each fifth moving element 77 that is configured to reciprocate a pair of second motorized runner 72 in a width direction of a vehicle on the mounting base 74 of the second mounting bracket 71 includes a third operating cylinder 83 and a third guider 85.

The third operating cylinder 83 is fixed on the mounting base 54 of the second mounting bracket 71 and is substantially connected to the second motorized runner 72 through the third operating rod 84.

The third guider 65 includes a second connection bracket 86 that is connected to the third operating rod 84 of the third operating cylinder 83, a second moving block 87 that is fixed on the second connection bracket 86 and is combined with the motorized nut runner portion 79 of the second motorized runner 72, a third guide rail 88 that is fixed on the mounting base 54 of the second mounting bracket 71, and a third guide block 89 that is fixed on the second connection bracket 86 and is slidably combined with the third guide rail 88.

Accordingly, when the third operation cylinder 83 is operated to move forward or backward the third operating rod 84, the second connection bracket 86 can reciprocate in a width direction of a vehicle through the third guide block 89 along the third guide rail 88.

Thereby, because a pair of second motorized runner 72 is fixed on the second connection bracket 86 through the second moving block 87, the second connection bracket 86 can reciprocate in a width direction of a vehicle width direction.

Figure 7:
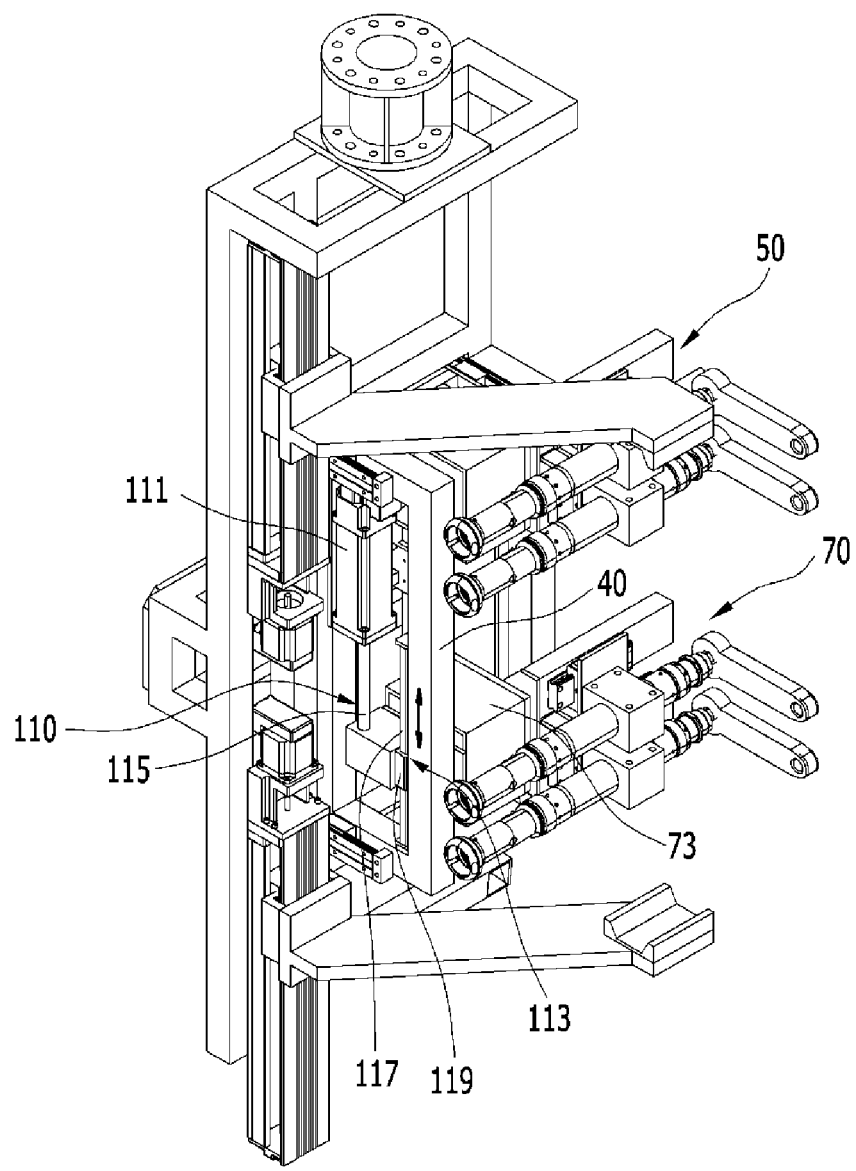
FIG. 7 shows a movement structure of a lower side bolt separation unit that is applied to a door separation device that is used in various kinds of vehicles according to an exemplary embodiment of the present invention.

Meanwhile, as described above, the lower side bolt separation unit 70 according to an exemplary embodiment of the present invention can be disposed to reciprocate in an upper and lower direction on the moving frame 40 through a sixth moving element 110 at a lower side of the upper side bolt separation unit 50 as shown FIG. 7 corresponding to a distance between an upper side and a lower side of the door hinge 5 of a vehicle body 1 side.

Referring to FIG. 7, in an exemplary embodiment of the present invention, the sixth moving element 110 is used to reciprocate the lower side bolt separation unit 70 in an upper and lower direction on the moving frame 40 and includes a fourth operating cylinder 111 and a fourth guider 113.

The fourth operating cylinder 111 is fixed on an upper side of the moving frame 40 and is connected to the lower side bolt separation unit 70 through the fourth operating rod 115. That is, the fourth operating rod 115 can be connected to the second rotation element 73 of the lower side bolt separation unit 70.

The fourth guider 113 includes a fourth guide rail 117 that is fixed on the moving frame 40 in an upper and lower direction and a fourth guide block 119 that is fixed on the second rotation element 73 of the lower side bolt separation unit 70 to be slidably combined with the fourth guide rail 117.

Accordingly, when the fourth operating cylinder 111 is operated, the fourth operating rod 115 moves forward or backward, the lower side bolt separation unit 70 slides on the fourth guide rail 117 through the fourth guide block 119 in an upper and lower direction to reciprocate in an upper and lower direction on the moving frame 40.

Meanwhile, as shown FIG. 1 and FIG. 2, the vision sensor 90 in an exemplary embodiment of the present invention is used to detect a position of a bolt of the door hinge 5 of the vehicle body through a vision method.

Several vision sensors 90 can be disposed on the base frame 10, wherein the sensors 90 can be disposed at left right both sides and at an upper side of the base frame 10 based on the drawings. The vision sensor 90 is a stereo type of 3D camera, detects a trim hole that is provided in an inner panel of the door 3, and can output the detected signal (vision data) to a controller.

Accordingly, the controller acquires the vision data from the vision sensor 90, analyzes this, and can detect a position of a bolt of an upper and lower side bolt of the vehicle body 1. That is, the controller acquires the vision data from the vision sensor 90, analyzes the position of a trim hole of an inner panel of the door that is different from each other depending on the kinds of a vehicle, and can detect a position of a bolt of the door hinge 5 depending on the position of the trim hole.

The vision sensor 90 is a stereo 3D camera that is well known to a person skilled in this art, and the detailed description thereof will be omitted in this specification.

Hereinafter, the operation of the door separation device 100 that is used in various kinds of vehicles according to an exemplary embodiment of the present invention will be described with reference to the drawings.

Firstly, in a vehicle body factory of a vehicle assembly line, a door hinge 5 is mounted on a vehicle body 1 through a door hinge mounting jig, and a door 3 is engaged with the door hinge 5 through a bolt. In this condition, a vehicle body 1 is transferred to a fitting factory along a transfer line.

Here, the door hinge 5 is respectively engaged with a front side pillar and a rear side pillar at the side assembly 6 of the vehicle body 1, and the door hinge 5 is engaged with the door 3 through a bolt. And, the door 3 is not fixed on the vehicle body 1 through a striker, and the door 3 is fixed on the vehicle body 1 through a door fixation belt.

In this condition, the door 3 has to be separated from the vehicle body 1 so as to mount any kinds of fittings in the vehicle body 1. For this, the door 3 is opened from the vehicle body 1 in the separation process.

Then, in an exemplary embodiment of the present invention, the door separation device 100 that is used in various kinds of vehicles that is mounted on the arm 9 of the robot 7 is moved toward an inner panel of the door 3 by the robot 7.

Here, the first gripper arm 21 of the upper side gripper 20 is moved toward an upper side direction by the first moving element 23, and the second gripper arm 31 of the lower side gripper 30 is moved toward a lower side direction by the second moving element 33.

In this condition, the first gripper arm 21 of the upper side gripper 20 is moved toward a lower side direction by the first moving element 23 and the second gripper arm 31 of the lower side gripper 30 is moved toward an upper side direction by the second moving element 33.

Then, the upper side gripper 20 grasps an upper end portion of the door 3 through the first attachment 22 that is disposed on the first gripper arm 21 and the lower side gripper 30 grasps a lower end portion of the door through the second attachment 32 that is disposed on the second gripper arm 31.

In this case, the second attachment 32 of the lower side gripper 30 is swiveled by the ball joint 37 and the swivel pad 39 to absorb an angle of a lower end portion of the door 3 and grip the lower end portion thereof.

After passing this process, in an exemplary embodiment of the present invention, a trim hole of an inner panel of the door 3 is detected (shot) by the vision sensors 90 and the detected signal (vision data) is outputted to a controller.

The controller acquires the vision data from the vision sensor 90, analyzes the position of a trim hole of an inner panel of the door that is different from each other depending on the kinds of a vehicle, and can detect a position of a bolt of the door hinge 5 depending on the position of the trim hole.

Because a position of a trim hole of a predetermined inner panel is different depending on the kinds of vehicles, it is evident that a position of the door hinge 5 and a bolt position of the door hinge 5 can be detected through logic of a controller.

After this, in an exemplary embodiment of the present invention, the moving frame 40 is reciprocated in a transfer direction of a vehicle body 1 through the third moving element 41 based on the bolt position of the door hinge 5 that is detected by the controller such that the position of the upper side bolt separation unit 50 and lower side bolt separation unit 70 is adjusted depending on the transfer direction of the vehicle body 1.

While the above process is being performed, in an exemplary embodiment of the present invention, the lower side bolt separation unit 70 is reciprocated by the sixth moving element 110 in an upper and lower direction based on the upper side bolt separation unit 50 corresponding to a distance between an upper side and a lower side of the door hinge 5 of the vehicle body 1 such that the position of the lower side bolt separation unit 70 is adjusted in an upper and lower direction of the moving frame 40.

Also, in an exemplary embodiment of the present invention, the upper side bolt separation unit 50 is rotated in an upper and lower direction by the first rotation element 53 to adjust the position of upper side bolt separation unit 50 corresponding to an engagement angle of an upper side door hinge 5 of a vehicle body 1 that is different from each other depending on the kinds of vehicles.

Simultaneously, in an exemplary embodiment of the present invention, the lower side bolt separation unit 70 is rotated in an upper and lower direction through the second rotation element 73 such that the position of the lower side bolt separation unit 70 is adjusted corresponding to an engagement angle of a lower side door hinge 5 of a vehicle body 1 that is different from each other depending on the kinds of vehicles.

In a condition that the position of the upper side bolt separation unit 50 and lower side bolt separation unit 70 is adjusted depending on the kinds of the vehicles, the first motorized runner 52 of the upper side bolt separation unit 50 is reciprocated by the fourth moving element 57 in a width direction of a vehicle to combine the bolt disjoint socket portion 61 of the first motorized runner 52 with a bolt of the upper side door hinge 5 in an exemplary embodiment of the present invention.

Simultaneously, the second motorized runner 72 of the lower side bolt separation unit 70 is reciprocated by the fifth moving element 77 in a width direction of a vehicle to combine the bolt disjoint socket portion 81 of the second motorized runner 72 with a bolt of the lower side door hinge 5 In an exemplary embodiment of the present invention.

Then, when each motorized nut runner portion 59 and 79 is respectively operated by an operating unit 78 and 58 of the first and second motorized runner 52 and 72 in an exemplary embodiment of the present invention, a bolt of the upper side and lower side door hinge 5 is separated by the bolt disjoint socket portion 81 of the first and second motorized runner 52 and 72.

Finally, after separating a bolt that engages the door hinge 5 with the door 3, the bolts is recovered and the door 3 is separated from the vehicle body 1 through the robot 7 or a separate jig in an exemplary embodiment of the present invention.

As described above, in a door separation device 100 that is used in various kinds of vehicles according to an exemplary embodiment of the present invention, the door 3 is automatically separated from various kinds of vehicle body 1 in a separation process of a fitting factory.

Also, the position of the motorized runner is varied corresponding to a door 3, a distance between a door hinge 5, and an engagement angle of a door hinge 5 that is respectively different from each other depending on the kinds of vehicles such that the door 3 is automatically separated from the vehicle body in an exemplary embodiment of the present invention.

Accordingly, because the door 3 is automatically separated from the vehicle body 1 in an exemplary embodiment of the present invention, a work time for separating the door 3 is reduced, the work is convenient, and a separation of a painting film of an inner panel is prevented, wherein the separation of the painting film is caused by an interference between a bolt separation tool and a door inner panel in a narrow space.

Also, because the door 3 is automatically separated in a fitting factory in an exemplary embodiment of the present invention, a cycle time and work force in the fitting factory can be reduced, a safety accident and a physical damage of a worker can be reduced, and production cost and investment cost of the vehicle can be saved.

Further, because the position of the motorized runner is adjusted corresponding to a door 3, a distance between a door hinge 5, and an engagement angle of a door hinge 5 that is different from each other depending on the kinds of vehicles in an exemplary embodiment of the present invention, the flexible productivity of various kinds of vehicles is improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A door separation device used for various kinds of vehicles to detach a door mounted on a vehicle body through a door hinge in a door separation process, comprising:
    an upper side gripper and a lower side gripper respectively mounted on a base frame configured to be mounted on an arm end of a robot, wherein the upper side gripper and the lower side gripper are movable in an upper direction and a lower direction of the base frame, so as to selectively grip an upper end and a lower end of the door;
    a moving frame disposed on the base frame to be movable in a transfer direction of the vehicle body; and
    an upper side bolt separation unit and a lower side bolt separation unit mounted to the moving frame and respectively having a pair of motorized runners for separating a bolt engaged with the door and an upper side hinge and a lower side hinge of the vehicle body,
    wherein the motorized runners mounted on the moving frame are configured to reciprocate in a vehicle width direction on the upper side bolt separation unit and the lower side bolt separation unit,
    wherein a first attachment is disposed on a second gripper arm and is configured to swivel through a ball joint and a swivel pad corresponding to a lower end portion angle of the door, and
    wherein the upper side gripper includes:
        a first gripper arm slidably disposed on a first moving element disposed on the base frame to be configured to reciprocate in the upper direction and the lower direction,
        a second attachment disposed on the first gripper arm to support the upper end of the door,
    wherein the upper side bolt separation unit and the lower side bolt separation unit are rotatably disposed on the moving frame and rotatable in an upper direction and a lower direction of the moving frame corresponding to an engagement angle of the door hinge,
    wherein the upper side bolt separation unit includes a first mounting bracket rotatably disposed on an upper side of the moving frame through a first rotation element,
    wherein a first pair of motorized runners is disposed on the first mounting bracket through a second moving element to reciprocate in a width direction of a vehicle,
    wherein the lower side bolt separation unit includes a second mounting bracket rotatably disposed at a lower side of the moving frame through a second rotation element,
    wherein a second pair of motorized runners is disposed on the second mounting bracket to reciprocate in the width direction of the vehicle through a third moving element, and
    wherein the upper side gripper and the lower side gripper are configured to be movable up and down through a drive motor and a LM (Linear Motion) module.

2. The door separation device of claim 1, wherein the lower side bolt separation unit is disposed on the moving frame to move in an upper and lower direction corresponding to a distance between door hinges based on the upper side bolt separation unit.

3. The door separation device of claim 1, comprising a plurality of vision sensors that is disposed on the base frame to detect a position of the bolt of the door hinge.

4. The door separation device of claim 1, wherein the lower side gripper includes:
    a second gripper arm disposed on a fourth moving element disposed on the base frame and is disposed on one straight line passing the first moving element to reciprocate in the upper and lower direction, and
    the first attachment disposed on the second gripper arm to support the lower end of the door.

5. The door separation device of claim 1, wherein the moving frame is disposed on the base frame to reciprocate in the transfer direction of the vehicle body by a fifth moving element having an operating cylinder.

6. The door separation device of claim 1, wherein the lower side bolt separation unit is disposed on the moving frame through a sixth moving element having an operating cylinder to reciprocate in the upper direction and the lower direction.

7. The door separation device of claim 1, wherein the motorized runners include a motorized nut runner portion and a bolt socket portion that is connected to the motorized nut runner portion.

8. A door separation device that is used for various kinds of vehicles to detach a door mounted on a vehicle body through a door hinge in a door separation process, comprising:
    a base frame disposed on an arm end of a robot;
    an upper side gripper and a lower side gripper disposed on the base frame and movable in an upper direction and a lower direction to grip an upper end and a lower end of the door;
    a moving frame disposed on the base frame to be movable in a transfer direction of the vehicle body;
    an upper side bolt separation unit disposed to an upper side of the moving frame to be movable in a width direction of a vehicle, and including a first pair of motorized runners mounted on the moving frame and separating a bolt engaged with an upper side door hinge of the vehicle body and a door;
    a lower side bolt separation unit disposed to reciprocate in the width direction of the vehicle, including a second pair of motorized runners mounted on the moving frame and separating a bolt engaged with a lower side door hinge of the vehicle body and the door, and disposed at a lower side of the moving frame to reciprocate in an upper and lower direction corresponding to a distance distribution between door hinges based on the upper side bolt separation unit;

rotating elements disposed on the moving frame and each of the rotating elements respectively rotating the upper side bolt separation unit and the lower side bolt separation unit corresponding to an engagement angle distribution of the door hinge; and a plurality of vision sensors disposed on the base frame to detect a position of a bolt of the door hinge, wherein the motorized runners include a motorized nut runner portion having an operating unit at a first side end portion thereof and a bolt separation socket portion connected to a second side end portion of the motorized nut runner portion, wherein the upper side bolt separation unit and the lower side bolt separation unit are rotatably coupled on the moving frame via a first rotating element and a second rotating element of the rotating elements, respectively, and rotatable in an upper direction and a lower direction of the moving frame corresponding to the engagement angle of the door hinge, and wherein the upper side gripper and the lower side gripper reciprocate on the base frame in the upper direction and the lower direction through a drive motor and a LM (Linear Motion) module respectively.

9. The door separation device of claim 8, wherein the moving frame reciprocates on the base frame in the transfer direction of the vehicle body through an operating cylinder and a guider.

10. The door separation device of claim 8, wherein the lower side bolt separation unit reciprocates on the moving frame in the upper and lower direction through an operating cylinder and a guider.

11. The door separation device of claim 8, wherein the motorized runners reciprocate on the moving frame in the width direction of the vehicle through an operating cylinder and a guider.

12. The door separation device of claim 8, wherein the vision sensor detects a trim hole that is formed in an inner panel of the door.

* * * * *